(12) United States Patent
Ravasi et al.

(10) Patent No.: US 11,959,537 B2
(45) Date of Patent: Apr. 16, 2024

(54) DIFFERENTIAL ASSEMBLY

(71) Applicant: Dana Italia S.r.l., Arco (IT)

(72) Inventors: Gian Mario Ravasi, Trento (IT); Federico Bavaresco, Trento (IT); Davide Deimichei, Trento (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 17/685,444

(22) Filed: Mar. 3, 2022

(65) Prior Publication Data
US 2022/0290751 A1 Sep. 15, 2022

(30) Foreign Application Priority Data
Mar. 9, 2021 (DE) .................... 20 2021 101 183.1

(51) Int. Cl.
*F16H 48/40* (2012.01)
*F16H 48/08* (2006.01)

(52) U.S. Cl.
CPC ............. *F16H 48/40* (2013.01); *F16H 48/08* (2013.01)

(58) Field of Classification Search
CPC ..................... F16H 48/08–2048/087
See application file for complete search history.

(56) References Cited

U.S. PATENT DOCUMENTS

| 2,037,961 | A | * | 4/1936 | Boden | F16C 19/54 384/571 |
| 2,578,155 | A | * | 12/1951 | Slider | F16H 57/037 475/230 |
| 5,556,344 | A | * | 9/1996 | Fox | F16H 48/22 475/234 |
| 5,857,936 | A | * | 1/1999 | Ishikawa | F16H 48/08 475/230 |
| 7,717,659 | B2 | * | 5/2010 | Lang | F16B 43/00 411/533 |
| 8,221,278 | B2 | | 7/2012 | Biermann et al. | |
| 9,958,047 | B1 | * | 5/2018 | Balenda, II | F16H 48/08 |

FOREIGN PATENT DOCUMENTS

| CN | 111895066 A | * | 11/2020 | |
| DE | 19638002 C1 | * | 4/1997 | ............ F16H 48/08 |
| DE | 102008000449 A1 | * | 9/2009 | ............ F16H 48/08 |
| WO | 2015060890 A1 | | 4/2015 | |

* cited by examiner

*Primary Examiner* — Ernesto A Suarez
*Assistant Examiner* — James J Taylor, II
(74) *Attorney, Agent, or Firm* — McCoy Russell LLP

(57) ABSTRACT

The present disclosure relates to a differential assembly that may have a differential case, a drive gear for driving the differential case, a first differential pin, and a connection member. The connection member fixedly connects the drive gear and the first differential pin to the differential case.

16 Claims, 3 Drawing Sheets

DIFFERENTIAL ASSEMBLY

FIELD

The present disclosure relates to a differential assembly. In particular, the present disclosure relates to a differential cross-connection. Differentials of the presently proposed type may be used in but are not limited to off-highway vehicles such as wheel loaders, dumpers, tippers, excavators, fork-lift trucks, tractors, harvesters, or the like.

BACKGROUND

Various types of differentials are known from the prior art. Differentials are used to transmit torque from a power source such as a combustion engine or an electric engine to two output shafts, typically to two drive axle half-shafts, thereby allowing the two driven output shafts to turn at different rotational speeds, for example when the vehicle drives around a curve. Typically, differential assemblies comprise a drive gear or crown gear fixedly mounted to a differential case and defining a rotation axis of the differential. Usually, the drive gear is configured to receive an input torque from an engine via an input shaft and to drive the differential case. In some differentials, a pair of differential pins is mounted inside the differential case and arranged perpendicular to the rotation axis, perpendicular with respect to each other and rotatably secured or fixed to the differential case, wherein the differential pins form a cross-connection or are connected via a cross-connection. Usually, spider gears are rotatably disposed on the differential pins and in driving engagement with a pair of side gears each of which is connected to one of the two output shafts.

Due to limited space within the differential case and the often complex design of the differential pin cross-connection and the intermeshing gears, the process of assembling the differential may be difficult, time consuming and thus prone to error. In addition, the differential pins and the differential case usually need to withstand a high degree of mechanical strain.

SUMMARY

Therefore, the present disclosure addresses the problem of designing a differential assembly including a differential case and a differential pin wherein the differential assembly is preferably easy to assemble and provides a preferably high degree of stability.

This object is solved by a differential assembly according to claim 1. Special embodiments are disclosed in the dependent claims. Additional aspects addressing an assembling method of the proposed differential assembly are disclosed as well.

The presently proposed differential assembly comprises:
  a differential case,
  a drive gear for driving the differential case,
  a first differential pin, and
  a connection member,
    wherein the connection member fixedly connects the drive gear and the first differential pin to the differential case.

Connecting the drive gear and the first differential pin to the differential case by means of the same connection member facilitates assembly and provides a stable connection between the differential case, the drive gear and the first differential pin.

The connection member may extend at least partially through the first differential pin. The connection member may be received in the first differential pin in a form-fit, i.e. in a positively locking manner. In particular, the connection member may be engaged with the first differential pin in a form-fit.

The drive gear may define a rotation axis. The connection member may be an elongate member. In particular, the connection member may extend in parallel to the rotation axis. In addition, the first differential pin may comprise a bore extending through or at least partially through the first differential pin. A portion of the connection member may be received in the bore in the first differential pin.

The connection member of the proposed differential assembly may extend through the drive gear. In addition, the connection member may extend through the differential case.

The connection member may be received in the differential case in a form-fit. In particular, the connection member may be engaged with the differential case in a form-fit.

In particular, the connection member may be received in a bore extending through the differential case. The bore in the differential case may comprise a first section adjacent the drive gear and a second section. The second section may be disposed between the first section and the first differential pin. A diameter of the first section may be larger than a diameter of the second section. However, a diameter of the first section may likewise be smaller than a diameter of the second section, depending on the order of the assembly of the differential case, the connection member and the drive gear. As a result, the bore in the differential case may provide a poka-yoke for the connection member. In particular, this may ease the assembly of the drive gear and the differential case, as typically the drive gear is fixedly mounted to the differential case by drive gear mounting means through additional bores in the drive gear and additional partial bores in the differential case, the additional bores having the same diameter. Thus, because of the different length and/or shape of the additional bores receiving the drive gear mounting means in relation to the bore receiving the connection member, the drive gear mounting means and the connection member are usually not interchangeable during assembly, thereby facilitating the assembly process.

Further, the differential case of the proposed differential assembly may have a first axially extending portion comprising the first section of the bore in the differential case and a second axially extending portion comprising the second section of the bore in the differential case. Depending on the first section of the bore having a diameter larger or smaller than a diameter of the second section of the bore, a first radial thickness of the first axially extending portion of the differential case in a radial direction perpendicular to the rotation axis defined by the drive gear may be respectively larger or smaller than a second radial thickness of the second axially extending portion of the differential case in a radial direction perpendicular to the rotation axis. As a result, material and thus weight of the differential case can be reduced without compromising or overly compromising the stability of the differential assembly.

The connection member of the proposed differential assembly may be engaged with one or more of the drive gear, the differential case and the first differential pin via a threaded connection. The bore in the differential case may at least partially comprise a female threaded portion and the connection member may at least partially comprise a corresponding male threaded portion.

The proposed differential assembly may comprise a further connection member fixedly connecting the drive gear and the first differential pin to the differential case. It is understood that the connection members may be configured in substantially the same manner in the differential assembly. The connection member and the further connection member may fixedly connect the first differential pin to the differential case at opposite ends of the first differential pin.

The first differential pin may comprise a first differential half-pin and a second differential half-pin. It is understood that the first and second differential half-pin may be configured in substantially the same manner in the differential assembly. The connection member may fixedly connect the drive gear and the first differential half-pin to the differential case. The further connection member may fixedly connect the drive gear and the second differential half-pin to the differential case.

The proposed differential assembly may further comprise a second differential pin. The second differential pin may be arranged perpendicularly to the first differential pin. The first differential half-pin and the second differential half-pin may each be accommodated in a recess or a through hole in the second differential pin. The first differential pin and the second differential pin may be connected by means of a form-fit between the first differential pin and the second differential pin. As a result, the two differential half-pins of the first differential pin lock or fix the second differential pin to or with respect to the differential case. The first differential pin and the second differential pin may extend perpendicular to the rotation axis defined by the drive gear.

In Addition, the first differential pin may include a mounting assist structure. For example, the mounting assist structure may comprise a groove. The groove may be provided at or in an end-face of the first differential pin, for example.

The second differential pin of the proposed differential assembly may be at least partially received in or extend through the differential case. In particular, the second differential pin may be received in a through hole extending through the differential case. The first differential pin of the proposed differential assembly may be at least partially received in or extend through the differential case. In particular, the first differential pin may be received in a through hole extending through the differential case. In addition, the through hole may have an increased diameter end section and the first differential pin may have an increased diameter end portion, wherein the increased diameter end section of the through hole forms a seat for the increased diameter end portion of the first differential pin and the increased diameter end portion of the first differential pin is accommodated in the increased diameter end section of the through hole. In addition or alternatively, the through hole extending through the differential case may have a non-circular cross section and an end portion of the first differential pin received within the through hole may have a correspondingly shaped non-circular cross section so that the first differential pin is non-rotatably received in the through hole. As a result, the designated orientation of the first differential pin during assembly can be facilitated.

One or more spider gears may be rotatably disposed on the first differential pin and/or on the second differential pin. In particular, a spider gear may be rotatably disposed on each of the first differential half-pin and the second differential half-pin.

The proposed differential assembly may include or may be configured as an open differential, a limited slip differential or a locking differential.

In addition, the present disclosure may also relate to a method for assembling the presently proposed differential assembly.

The method may comprise the steps of:
a. providing a differential case, a drive gear for driving the differential case, a first differential pin, the first differential pin preferably comprising at least a first differential half-pin, a connection member fixedly connecting the drive gear and the first differential pin to the differential case, and/or a second differential pin, and/or at least two spider gear assemblies, and/or a plurality of drive gear mounting members.

Additionally, the method may comprise one or more of the following steps:
b. inserting the second differential pin in the differential case through a first through hole in the differential case, wherein the second differential pin is oriented perpendicular to a rotation axis defined by the drive gear;
c. assembling at least one of the at least two spider gear assemblies on the second differential pin once the second differential pin is extending through the first through hole;
d. inserting the first differential half-pin in the differential case through a second through hole in the differential case, wherein the first differential half-pin is oriented perpendicular to a rotation axis defined by the drive gear and/or perpendicular to the second differential pin;
e. assembling at least one of the at least two spider gear assemblies on the first differential half-pin once the first differential half-pin is extending through the second through hole;
f. repeating steps d and e with a second differential half-pin inserted through a third through hole in the differential case and a further spider gear assembly;
g. fixedly mounting the drive gear to the differential case by engaging the connection member with the drive gear, the differential case and/or the first differential half-pin and/or the second differential half-pin;
h. tightening the drive gear to the differential case by mounting the drive gear mounting members through the drive gear to the differential case.

DESCRIPTION OF THE FIGURES

A differential assembly according to the prior art and an embodiment of the presently proposed differential assembly are described in the following detailed description and are illustrated in the accompanying figures in which.

DETAILED DESCRIPTION

Figure 1A:
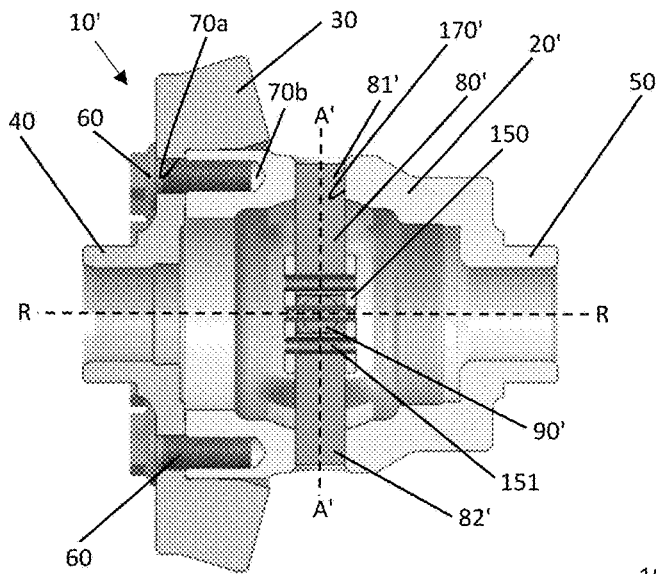
FIG. 1a shows a sectional view of a typical differential assembly known from prior art.
Figure 1B:
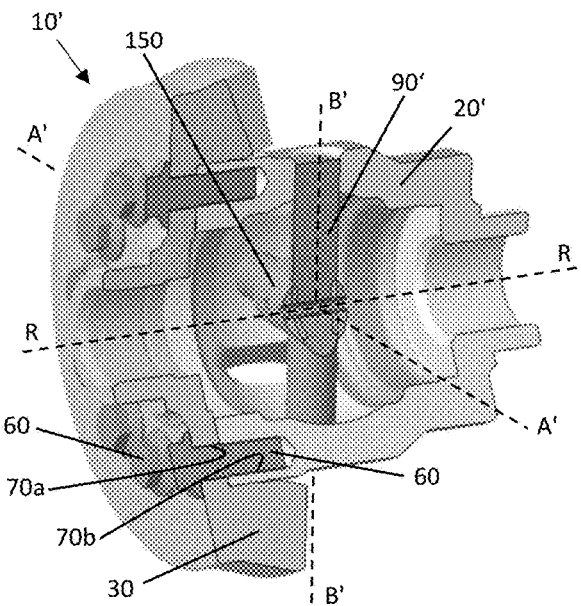
FIG. 1b shows a cutaway view of the differential assembly shown in FIG. 1a, FIG. 1c shows a second sectional view of the differential assembly shown in FIG. 1a including spider gears.

In FIGS. 1a and 1b illustrate a differential assembly 10' as known from the prior art. Here and in all of the following, features recurring in different figures are designated with the same reference signs. Specifically, FIG. 1a shows a sectional view of the differential assembly 10' along a section plane including a rotation axis R defined by a crown gear or drive gear 30 or by a differential case 20', and including a symmetry axis of a first differential pin 80' of the differential assembly 10'. FIG. 1b shows a cutaway view of the differential assembly 10' of FIG. 1a. The drive gear 30 is fixedly secured to the differential case 20' by means of a plurality of mounting means 60. For example, the mounting means 60 may include screws securing or fixing the drive gear 30 to the differential case 20' by means of a threaded connection between the screws and the differential case 20'. A first output flange 40 and a second output flange 50 are provided coaxially with the rotation axis R and are configured to receive a first output shaft or first axle half shaft (not shown) and a second output shaft or first axle half shaft (not shown), respectively. Typically, the drive gear 30 is drivingly engaged with an engine such as a combustion engine or an electric engine via an input shaft (not shown). The mounting means 60 are received in a form-fit in corresponding bores 70a, 70b in the drive gear 30 and in the differential case 20', respectively. The bores 70a, 70b extend through the drive gear 30 and partially through the differential case 20'. Here, the bores 70a, 70b have equal in diameters. Typically, the bores 70a, 70b include a female threaded portion and the mounting means 60 include a male threaded portion configured to be engaged with the female threaded portion of the bores 70a, 70b.

A first differential pin 80' and a second differential pin 90' are mounted on the differential case 20'. The first differential pin 80' extends through the differential case 20'. The first differential pin 80' is an elongate member having a longitudinal axis A', and the second differential pin 90' is an elongate member having a longitudinal axis B'. The first differential pin 80' comprises a first differential half-pin 81' and a second differential half-pin 82'. The differential pins 80', 90' are disposed relative to the differential case 20' or are mounted on the differential case 20' in such a way that the three axes A', B' and R are mutually perpendicular with respect to each other. Each of the two ends of the first differential pin 80' and of the second differential pin 90' is at least partially received in one of a plurality of through holes 170' extending through the differential case 20' in a direction perpendicular to the rotation axis R. The first differential pin 80' and the second differential pin 90' are each received in one of the through holes 170' of the differential case 20' in a form-fit. Thereby, the first differential pin 80' and the second differential pin 90' are secured or fixed to the differential case 20'. The first differential pin 80' and the second differential pin 90' are prevented from rotating with respect to their longitudinal axes A', B', respectively.

The first differential pin 80' and the second differential pin 90' are connected to one another via a cross-connection. Specifically, the cross-connection between the differential pins 80', 90' comprises a cylindrical differential pin sleeve 150 which extends along the longitudinal axis A' of the first differential pin 80'. The differential pin sleeve 150 is positioned at or near a point where the mutually perpendicular axis A' defined by the first differential pin 80', the axis B' defined by the second differential pin 90' and the rotation axis R intersect. Each of the first differential half-pin 81' and the second differential half-pin 82' is received or at least partially received within the differential pin sleeve 150 at opposite ends of the differential pin sleeve 150 along its longitudinal axis. The second differential pin 90' extends through the differential pin sleeve 150 perpendicular to the first differential pin 80'. Three spring pins 151 are provided inside the differential pin sleeve 150. The three spring pins 151 extend through the first differential half-pin 81', through the second differential half-pin 82' and through the second differential pin 90', respectively. The three spring pins 151 are secured or fixed to the differential pin sleeve 150.

Figure 1C:
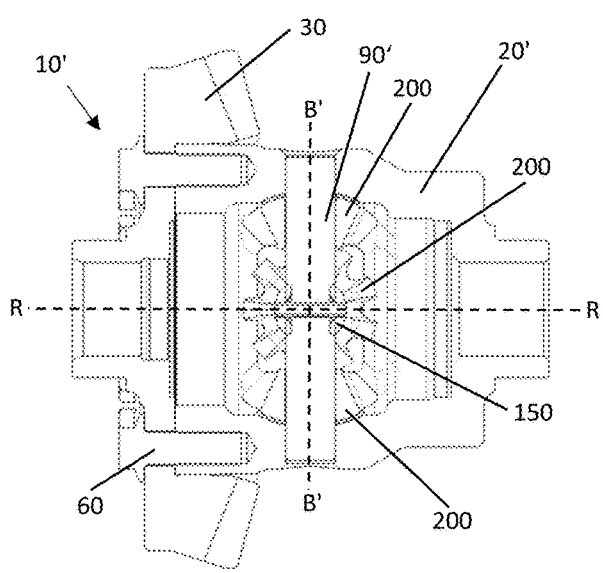

FIG. 1c shows a sectional view of the differential assembly 10' of FIGS. 1a and 1b along the R-B' sectional plane. According to FIG. 1c, at least one spider gear assembly 200 may be provided on the first and/or on second differential pin 80', 90'. Typically, each spider gear assembly 200 is rotatably disposed on a section of one of the differential pins 80', 90' extending between the differential pin sleeve 150 and the differential case 20'. For example, each spider gear assembly 200 may comprise a spider gear and at least one washer such as a thrust washer.

Figure 2A:
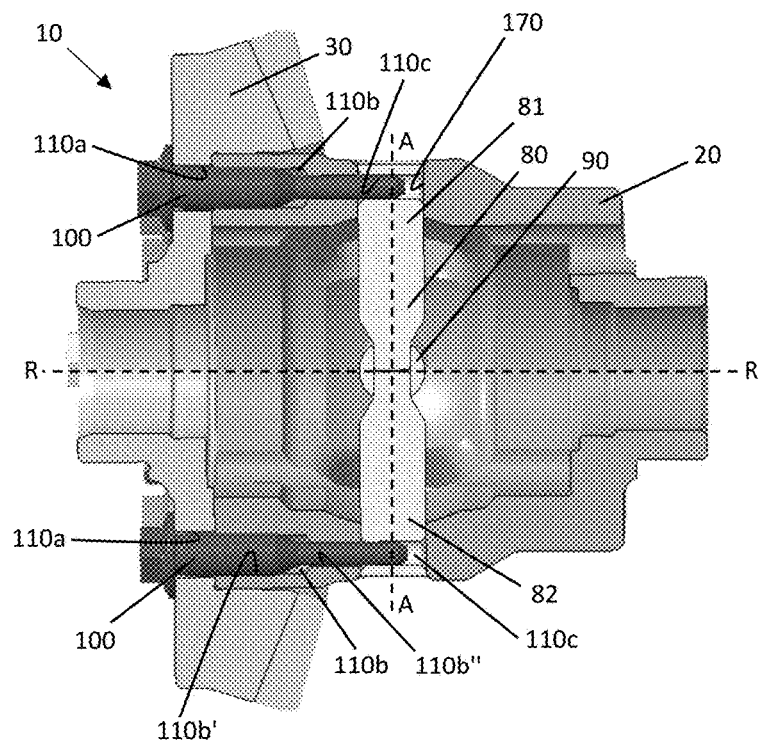
FIG. 2a shows a sectional view of a differential assembly according to a preferred embodiment of the present disclosure.
Figure 2B:
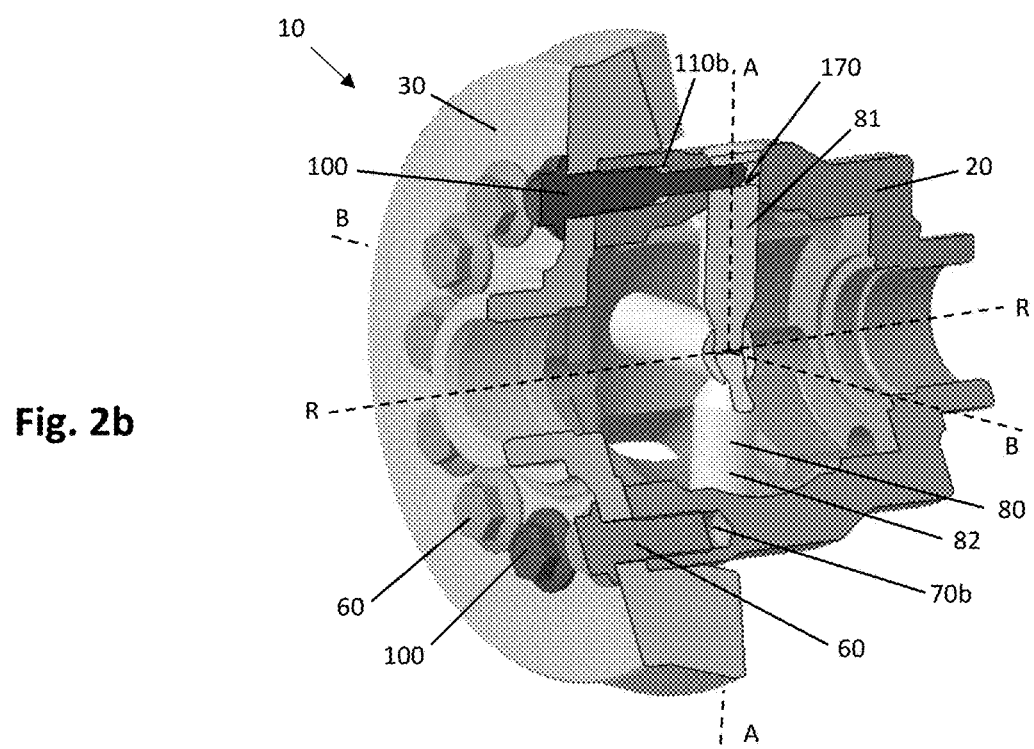
FIG. 2b shows a cutaway view of the differential assembly shown in FIG. 2a, FIG. 2c shows an enlarged section of FIG. 2a, and FIG. 2d shows a second sectional view of the differential assembly shown in FIG. 2a including spider gears.
Figure 2C:
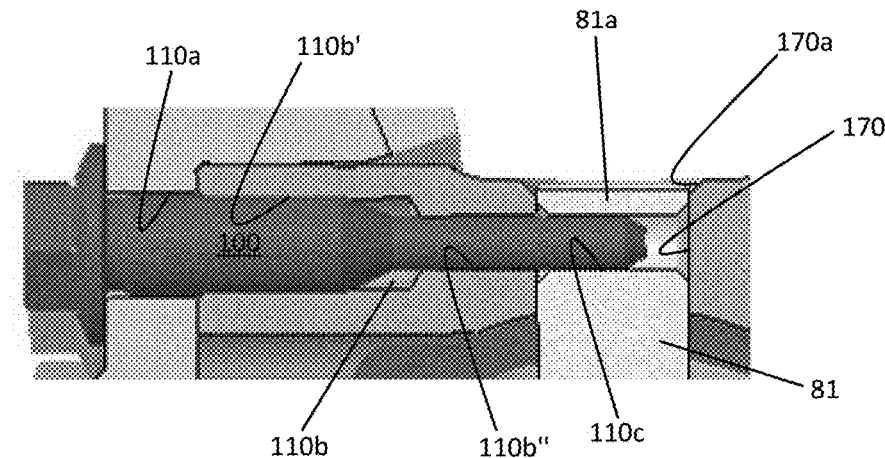
Figure 2D:
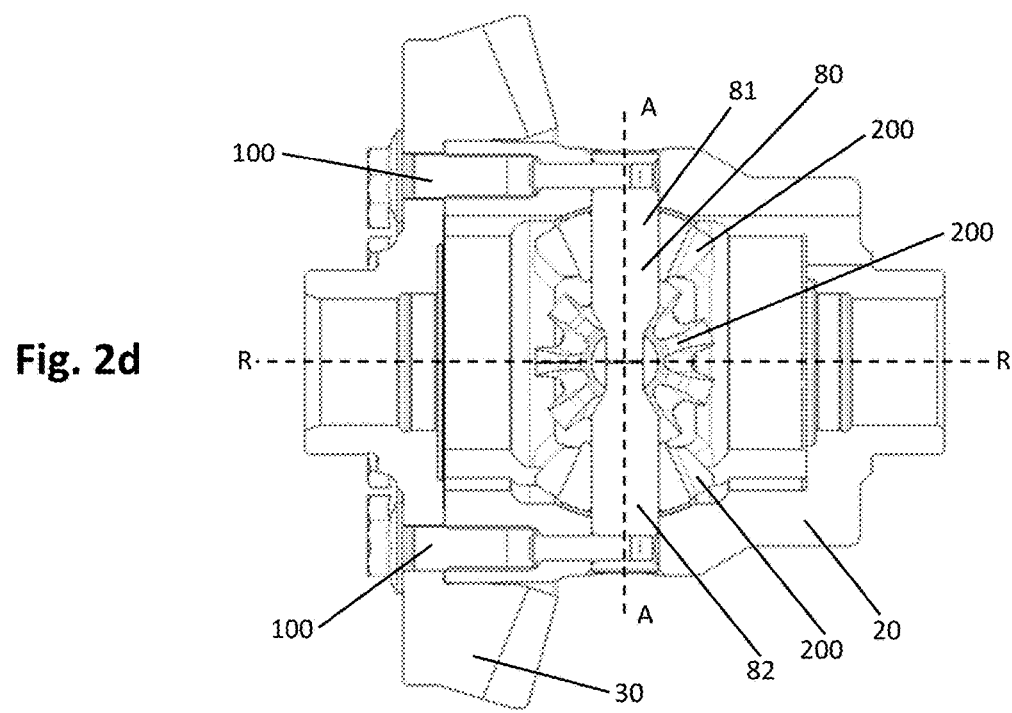

FIGS. 2a-d show an embodiment of a differential assembly 10 of the presently proposed type. In the following, only differences between the differential assembly 10 of FIGS. 2a-d and the differential assembly 10' of FIGS. 1a-c are described in some detail. In this regard, FIGS. 2a and 2c show a sectional view of the differential assembly 10 along a section plane including a rotation axis R defined by a crown gear or drive gear 30 or by a differential case 20, and a symmetry axis of a first differential pin 80 of the differential assembly 10. FIG. 2b shows a cutaway view of the differential assembly 10. FIG. 2c shows an enlarged view of a detail of FIG. 2a. Similar to FIG. 1c, FIG. 2d depicts a possible arrangement of spider gear assemblies 200.

In the embodiment depicted in FIGS. 2a-d, a first differential pin 80 and a second differential pin 90 are mounted on the differential case 20 and extend through the differential case 20. The first differential pin 80 comprises a first differential half-pin 81 and a second differential half-pin 82. The first and the second differential half-pin 81, 82 may be identical in design, for example. The first differential pin 80 is an elongate member having a longitudinal axis A, and the second differential pin 90 is an elongate member having a longitudinal axis B. The differential pins 80, 90 are disposed relative to the differential case 20 or mounted on the differential case 20 in such a way that the axes A and B and the rotation axis R defined by the drive gear 30 or by the differential case 20 are mutually perpendicular with respect to each other. Each of the two ends of the first differential pin 80 and of the second differential pin 90 are at least partially received in one of a plurality of through holes 170 extending through the differential case 20. The through holes 170 extend through the differential case 20 perpendicular to the rotation axis R. The ends of the first and of the second differential pin 80, 90 are each received in one of the through holes 170 of the differential case 20 in a form-fit.

Thereby, the first and the second differential pin 80, 90 are prevented from rotating relative to the differential case 20.

The first differential pin 80 and the second differential pin 90 are connected to each other via a cross-connection. Specifically, each of the first differential half-pin 81 and the second differential half-pin 82 is partially received in a through hole extending through the second differential pin 90. The first and the second differential half-pin 81, 82 are received in the through hole extending through the second differential pin 90 in a form-fit. The first differential half-pin 81 and the second differential half-pin 82 abut each other. In particular, the cross-connection between the first differential pin 80 and the second differential pin 90 is located or positioned in a region or at a point where the longitudinal axis A defined by the first differential pin 80, the longitudinal axis B defined by the second differential pin 90 and the rotation axis R intersect. In addition, in order to prevent the second differential pin 90 from rotating relative to the differential case 20 with respect to its longitudinal axis B, the form-fit between the differential half-pins 81, 82 and the second differential pin 90 may be asymmetrical with respect to the longitudinal axis B of the second differential pin 90. For example, the first differential half-pin 81 and the second differential half-pin 82 may comprise complementary forms or shapes at their adjacent ends, such as complementary stepped portions, complementary indentations and protrusions, or the like.

The differential assembly 10 includes connection members 100 connecting the first differential half-pin 81, the second differential half-pin 82 and the drive gear 30 to the differential case 20. The connection members 100 are elongate members extending in a direction parallel to the rotation axis R defined by the drive gear 30 or by the differential case 20.

The drive gear 30 comprises bores 110*a*. Each of the bores 110*a* extends through the drive gear 30 in parallel to the rotation axis R. Similarly, the differential case 20 includes bores 110*b*. Each of the bores 110*b* extends at least partially through the differential case 20 in parallel to the rotation axis R. In particular, each of the bores 110*b* extending through the differential case 20 ends in or is in communication with one of the through holes 170 which extend through the differential case 20 in a direction perpendicular to the rotation axis R and which are configured to accommodate or to receive the differential half-pins 81, 82. Finally, each of the differential half-pins 81, 82 comprises a bore 110*c*. The bores 110*c* extend through the differential half-pins 81, 82 in parallel to the rotation axis R, respectively. In alternative embodiments the bores 110*c* may only partially extend through the differential half-pins 81, 82. Each one of the bores 110*a* is aligned with one of the bores 110*b* and with one of the bores 110*c* to receive one of the connection members 100 in the bores 110*a-c*. In particular, each of the connection members 100 is received in the aligned bores 110*a-c* in a form-fit. In this manner, the connection members 100 fixedly connect the drive gear 30 and the differential pin 80 or the differential half-pins 81, 82 of the differential pin 80 to the differential case 20. One or more of the bores 110*a-c* may include a female threaded portion, and the connection members 100 may include a male threaded portion configured to be engaged with the female threaded portion of the one or more of the bores 110*a-c*.

The bores 110*b* extending through the differential case 20 in parallel to the rotation axis R each comprise a first axially extending section 110*b*' and a second axially extending section 110*b*". The first axially extending section 110*b*' may be disposed adjacent the drive gear 30. The second axially extending section 110*b*" may be disposed in between the first axially extending section 110*b*' and the through hole 170 with which the bore 110*b* is in communication, or in between the first axially extending section 110*b*' and the first differential pin 80.

The first axially extending section 110*b*' of the bore 110*b* has a larger diameter than the second axially extending section 110*b*" of the bore 110*b*, wherein the diameter of the bore 110*b* is determined in a plane perpendicular to the rotation axis R. Accordingly, the connection members 100 each comprise an axially extending increased diameter portion 100' and an axially extending decreased diameter portion 100". A diameter of the increased diameter portion 100' is larger than a diameter of the decreased diameter portion 100", wherein in each case the diameter of the connection member 100 is determined in a plane perpendicular to the rotation axis R. As can be seen in FIGS. 2*a-c*, in each case the increased diameter portion 100' of the connection member 100 is received or at least partially received in a form-fit within the first axially extending section 100*b*' of the bore 100*b*, and the decreased diameter portion 100" of the connection member 100 is received or at least partially received in a form-fit within the second axially extending section 100*b*" of the bore 100*b* and within the bore 100*c* extending or at least partially extending through one of the differential half-pins 81, 82. In addition, a radial thickness of a first axially extending portion 20' of the differential case 20 comprising the first axially extending section 110*b*' of the bore 110*b* is larger than a radial thickness of a second axially extending portion 20" of the differential case 20 comprising the second axially extending section 110*b*" of the bore 110*b*, wherein the radial thickness of the differential case 20 is determined perpendicular to the rotation axis R.

In order to additionally constrain movement of the first differential half-pin 81 and of the second differential half-pin 82 relative to the differential case 20, the through holes 170 in the differential case 20 in which the differential half-pins 81, 82 are received may each comprise an increased diameter end section 170*a*, and the first and the second differential half-pin 81, 82 may each have a corresponding increased diameter end portions 81*a*, 82*a*, wherein the increased diameter end sections 170*a* of the through holes 170 form a seat for the increased diameter end portions 81*a*, 82*a* of the first and of the second differential half-pin 81, 82, respectively. For example, the increased diameter end sections 170*a* of the through holes 170 may be disposed at an end of the radially extending through holes 170 which is averted from the rotation axis R. For instance, the increased diameter end sections 170*a* of the through holes 170 may include a tapered portion. For example, the tapered portion may taper towards the rotations axis R. In addition or alternatively, the through holes 170 may have a non-circular cross-section and the end portions of the differential half-pins 81, 82 received within the through holes 170 may have correspondingly shaped non-circular cross-sections, respectively, so that the differential half-pins 81, 82 are non-rotatably received in the through holes 170.

A method for assembling the presently proposed differential assembly 10 may comprise the steps of:

a. providing a differential case 20, a drive gear 30 for driving the differential case 20, a first differential pin 80, the first differential pin 80 preferably comprising at least a first differential half-pin 81, a connection member 100 fixedly connecting the drive gear 30 and the first differential pin 80 to the differential case 20, a second differential pin 90, at least two spider gear assemblies 200, a plurality of drive gear 30 mounting means 60.

The method may further comprise one or more of the following steps:

b. inserting the second differential pin 90 in the differential case 20 through a first through hole 170 in the differential case 20, wherein the second differential pin 90 is oriented perpendicular to a rotation axis R defined by the drive gear 30;

c. assembling at least one of the at least two spider gear assemblies 200 on the second differential pin 90 once the second differential pin 90 is extending through the first through hole 170;

d. inserting the first differential half-pin 81 in the differential case 20 through a second through hole 170 in the differential case 20, wherein the first differential half-pin 81 is oriented perpendicular to a rotation axis R defined by the drive gear 30 and perpendicular to the second differential pin 90;

e. assembling at least one of the at least two spider gear assemblies 200 on the first differential half-pin 81 once the first differential half-pin 81 is extending through the second through hole 170;

f. repeating steps d and e with a second differential half-pin 82 inserted through a third through hole 170 in the differential case 20 and a further spider gear assembly 200;

g. fixedly mounting the drive gear 30 to the differential case 20 by engaging the connection member 100 with the drive gear 30, the differential case 20, the first differential half-pin 81 and the second differential half-pin 82;

h. tightening the drive gear 30 to the differential case 20 by mounting the drive gear 30 mounting members 60 through the drive gear 30 to the differential case 20.

The invention claimed is:

1. An open differential assembly, comprising:
a differential case,
a drive gear for driving the differential case,
a first differential pin extending through a through hole in the differential case, and a connection member,
wherein the differential case includes a first section and a second section that are positioned on opposing sides of the through hole,
wherein the first section of the differential case is adjacent to the drive gear,
wherein the connection member extends through a first bore in the drive gear and a second bore in the differential case, and partially through a third bore in the first differential pin to fixedly connect the drive gear and the first differential pin to the differential case,
wherein the connection member includes a larger diameter section, a smaller diameter section, and a shoulder section that is arranged between the larger diameter section and the smaller diameter section,
wherein a gap is formed between the shoulder section of the connection member and an interior surface of the second bore,
wherein the gap has a continuous boundary that is formed between the shoulder section of the connection member and the interior surface of the second bore,
wherein a terminal end of the connection member is spaced away from the second section of the differential case and is positioned in the third bore, wherein the second section of the differential case does not include a connection member bore,
wherein the connection member includes a head that has a surface in face sharing contact with a side surface of the drive gear, and
wherein the drive gear includes an output flange section that continuously extends from the first bore to:
an interior surface that defines an output shaft opening; and
an inboard surface that is positioned radially inward from the differential case.

2. The open differential assembly of claim 1, wherein the drive gear defines a rotational axis R, and wherein the connection member is an elongate member and extends in parallel to the rotational axis R.

3. The open differential assembly of claim 1, further comprising a screw that is positioned adjacent to the connection member and is threaded into the drive gear and the differential case.

4. The open differential assembly of claim 1, wherein the connection member is received in or engaged with the differential case in a form-fit.

5. The open differential assembly of claim 4, wherein the second bore in the differential case comprising a first section adjacent to the drive gear and a second section, and wherein a diameter of the first section is larger than a diameter of the second section.

6. The open differential assembly of claim 5, wherein the drive gear defines a rotational axis R, wherein the differential case has a first axially extending portion comprising the second bore in the differential case, wherein the differential case has a second axially extending portion comprising the second bore in the differential case, and wherein a first radial thickness of the first axially extending portion of the differential case in a radial direction perpendicular to the rotational axis R is larger than a second radial thickness of the second axially extending portion of the differential case in the radial direction perpendicular to the rotational axis R.

7. The open differential assembly of claim 1, wherein the connection member is engaged with at least one of the drive gear, the differential case, and the first differential pin via a threaded connection, wherein the threaded connection extends from the head to the terminal end.

8. The open differential assembly of claim 1, further comprising a further connection member fixedly connecting the drive gear and the first differential pin to the differential case, the connection member and the further connection member fixedly connecting the first differential pin to the differential case at opposite ends of the first differential pin.

9. The open differential assembly of claim 1, wherein the first differential pin comprises a first differential half-pin and a second differential half-pin, wherein the connection member fixedly connects the drive gear and the first differential half-pin to the differential case, and wherein a further connection member fixedly connects the drive gear and the second differential half-pin to the differential case.

10. The open differential assembly of claim 9, wherein the first differential half-pin and the second differential half-pin are each accommodated in a recess or a through hole in a second differential pin.

11. The open differential assembly of claim 1, further comprising a second differential pin arranged perpendicular to the first differential pin.

12. The open differential assembly of claim 11, wherein the first differential pin and the second differential pin are connected by a form-fit between the first differential pin and the second differential pin.

13. The open differential assembly of claim 11, wherein the drive gear defines a rotational axis R, and wherein the first differential pin and the second differential pin extend perpendicular to the rotational axis R.

14. The open differential assembly of claim 1, wherein the first differential pin includes a mounting assist structure, the mounting assist structure comprising a groove at an end-face of the first differential pin.

15. The open differential assembly of claim 1, wherein the first differential pin is received in the through hole extending through the differential case, the through hole having an increased diameter end section and the first differential pin having an increased diameter end portion, wherein the increased diameter end section of the through hole includes a tapered portion and the tapered portion tapers towards a rotational axis R, and wherein the through hole increased diameter end section forms a seat for the increased diameter end portion of the first differential pin and the increased diameter end portion of the first differential pin is accommodated in the increased diameter end section of the through hole.

16. The open differential assembly of claim 1, wherein the through hole extending through the differential case has a non-circular cross section and an end portion of the first differential pin received within the through hole has a correspondingly shaped non-circular cross section so that the first differential pin is non-rotatably received in the through hole.

\* \* \* \* \*